United States Patent [19]
Kline et al.

[11] Patent Number: 6,125,763
[45] Date of Patent: Oct. 3, 2000

[54] INTEGRAL SOLID BOOSTER AND HYBRID THRUST SUSTAINING SYSTEM AND PROJECTILE INCORPORATING THE SAME

[75] Inventors: Korey R. Kline, Miami; Kevin W. Smith; Thomas O. Bales, both of Coral Gables, all of Fla.

[73] Assignee: Environmental Aeroscience Corp., Miami, Fla.

[21] Appl. No.: 09/134,322

[22] Filed: Aug. 14, 1998

[51] Int. Cl.[7] ............................. F42B 15/10; C06B 45/00
[52] U.S. Cl. ......................... 102/381; 102/287; 102/291; 102/349; 102/352; 102/374; 102/202.7; 102/275.6; 60/253; 60/259
[58] Field of Search ..................... 102/287, 291, 102/323, 349, 352, 374, 381, 202.7, 275.6, 275.11; 60/253, 259

[56] References Cited

U.S. PATENT DOCUMENTS

| | | | |
|---|---|---|---|
| 3,164,093 | 1/1965 | Holzman | 102/98 |
| 3,334,489 | 8/1967 | Vilet | 60/251 |
| 3,443,475 | 5/1969 | Berton | 89/1.8 |
| 3,677,010 | 7/1972 | Fink et al. | 60/220 |
| 3,754,507 | 8/1973 | Dillinger et al. | 102/374 |
| 3,889,462 | 6/1975 | Beichel et al. | 102/374 X |
| 4,424,679 | 1/1984 | Holzman | 60/251 |
| 4,723,736 | 2/1988 | Rider | 102/381 X |
| 4,930,420 | 6/1990 | Meffert et al. | 102/374 X |
| 4,936,220 | 6/1990 | Burns et al. | 102/374 X |
| 5,010,730 | 4/1991 | Knuth et al. | 60/246 |
| 5,099,645 | 3/1992 | Schuler et al. | 60/219 |
| 5,101,623 | 4/1992 | Briley | 60/251 |
| 5,119,627 | 6/1992 | Bradford et al. | 102/287 X |
| 5,431,104 | 7/1995 | Barker | 102/202.7 X |
| 5,435,128 | 7/1995 | Miskelly, Jr. et al. | 102/381 X |
| 5,579,636 | 12/1996 | Rosenfield | 60/251 |
| 5,715,675 | 2/1998 | Smith et al. | 60/251 |
| 5,722,232 | 3/1998 | Jones | 60/259 |

FOREIGN PATENT DOCUMENTS

728880  3/1966  Canada .

*Primary Examiner*—Peter A. Nelson
*Attorney, Agent, or Firm*—David P. Gordon; David S. Jacobson; Thomas A. Gallagher

[57] ABSTRACT

A rocket according to the invention includes a motor having a fuel chamber and an oxidizer tank, a nose portion provided forward of the motor, and a nozzle surrounded by fins provided aft of the motor. The fuel chamber is provided with a relatively central solid propellant, and a hybrid fuel surrounds the solid propellant. The oxidizer tank is filled with a reactant and coupled to the forward end of the fuel chamber. A pathway is provided between the tank and the fuel chamber for the passage of reactant therethrough. At least one of a valve and a barrier is coupled in the pathway to prevent passage of the reactant into the fuel chamber until after the solid propellant is at least partially consumed. After the solid propellant is at least partially consumed, the valve is opened and/or the barrier is removed to permit the passage of reactant into the fuel chamber. The reactant exothermically reacts with the heated hybrid fuel to create a combustive reaction which creates additional and sustained thrust for the rocket. As a result, the rocket has high initial thrust and sustained thrust, enabling the rocket to maintain maximum velocity and reach a relatively higher altitude than possible with either a solid propellant system or a hybrid propellant system alone.

20 Claims, 9 Drawing Sheets

INTEGRAL SOLID BOOSTER AND HYBRID THRUST SUSTAINING SYSTEM AND PROJECTILE INCORPORATING THE SAME

BACKGROUND OF THE INVENTION

1. Field of the Invention

This invention relates broadly to self-propelled projectiles. More particularly, this invention relates to rockets powered by both solid propellant and hybrid propellant systems.

2. State of the Art

Rocket boosters (motors) generally fall into three classes: solid propellant boosters in which a solid fuel element, or grain, undergoes combustion to produce thrust that propels the rocket, liquid propellant boosters that accomplish the same function with a liquid fuel material, and hybrid boosters, described below. Solid and liquid rocket boosters can produce relatively large amounts of thrust, but for a relatively short amount of time. In addition, solid and liquid rocket boosters are generally expensive to develop and produce due to the inherent dangers of the highly combustible solid fuels.

Hybrid rocket boosters are described in detail in co-owned U.S. Pat. No. 5,715,675 to Smith et al., which is hereby incorporated by reference herein in its entirety. They have been characterized as a cross between a solid propellant booster and a liquid propellant booster. Generally hybrid boosters use a fluid reactant (oxidizer) to burn a solid fuel element, although they may use a combustible liquid fuel and a solid reactant. The hybrid rocket propellant (fuel and reactant together) can be ignited by an igniter, such as an electrically-generated spark, by pyrotechnic means, or by initial injection of an ignition fluid which exothermically reacts with the fuel or reactant. The fuel of a hybrid rocket is inert until mixed with the reactant (oxidizer) in the presence of an igniter. As such, there is no danger of inadvertent and uncontrollable combustion. In addition, hybrid boosters have the advantage of easily being able to start, stop, and restart based on the release of the oxidizer. Moreover, regulation of the release of the oxidizer permits a prolonged period of thrust relative to solid propellant boosters. While hybrid rocket boosters generally do not have the high thrust of solid propellant rocket boosters, hybrid rockets are generally favored in situations where it is desired to tradeoff high initial thrust for long burn time, safety and control.

In addition, there is also a need for flight vehicles, such as rockets, for educational and military use. In particular, rockets for educational use would provide hands on experience for students in the development of payloads and permit result comparison with existing data. However, such rockets would need to satisfy several criteria. First, the cost per rocket would necessarily have to be relatively low as funds available for educational purposes are extremely limited. Second, the rocket would be required to carry a relatively high payload weight, e.g., a hundred pounds minimum. Third, the rocket would preferably reach a relatively high altitude; such as to the edge of space, which is approximately fifty miles. With respect to military tactical use, it will be appreciated that a rocket satisfying these requirements, e.g., low cost, sufficient payload weight, and high altitude, could also have use as targets and reentry vehicles for anti-ballistic and airborne laser programs; i.e., rockets could be SCUD simulators.

Figure 1:
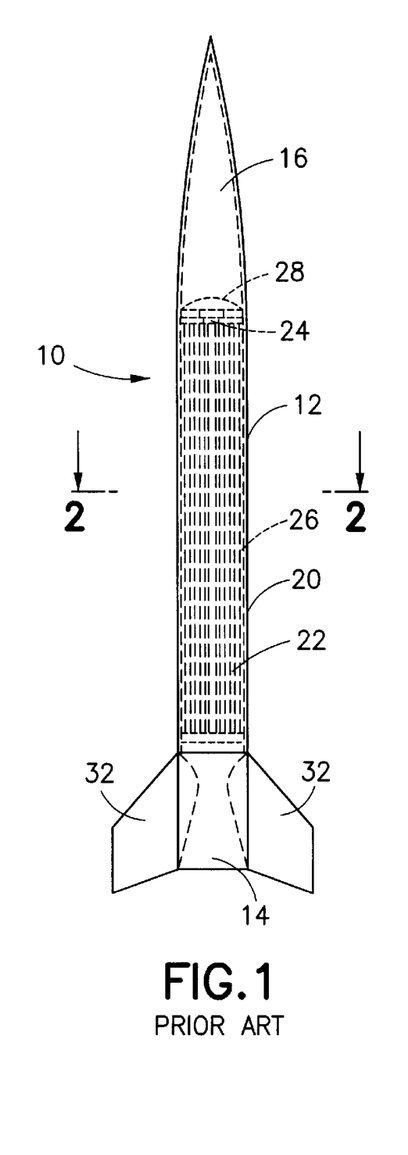
FIG. 1 is a side elevation of a rocket having a solid fuel booster.
Figure 2:
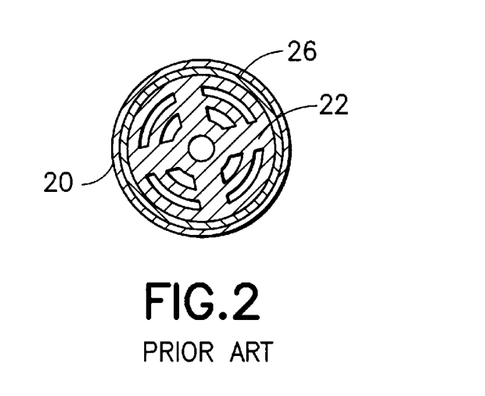
FIG. 2 is an enlarged cross-section through line 2—2 of FIG. 1.
Figure 3:
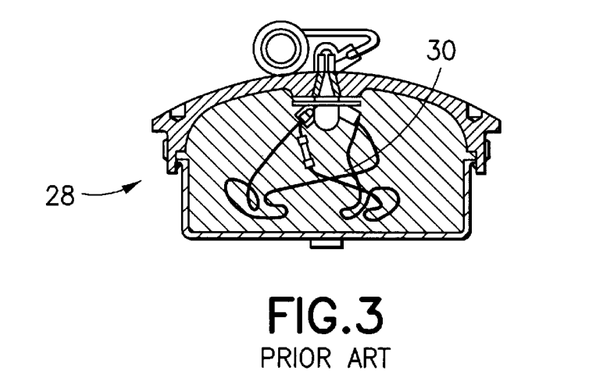
FIG. 3 is a section view of an ignition basket of the solid fuel booster of FIG. 1.

One potentially viable rocket for educational uses and disposable military uses is a surplus rocket utilizing standard solid-propellant booster motors. Such motors are inexpensive, widely available, inventory surplus items. Referring to prior art FIGS. 1 through 3, the rocket 10 generally has a solid fuel booster 12, a nozzle 14 aft of the booster 12, and a nose cone 16 payload carrying portion bolted to the forward end of the booster 12. The booster 12 includes a steel casing 20 housing a solid fuel grain 22 (in a wagon wheel configuration) and has a forward igniter port 24. The booster 12 includes a head end ignition basket 28 coupled to the igniter port 24. The ignition basket 28 has an igniter 30 (FIG. 3) for igniting the solid fuel 22. Between the casing 20 and the fuel grain 22 are provided insulation, inhibitor, liner, immobilizer, and resonance rods, collectively 26, primarily made from cellulose acetate and rubber, which are mostly required to bond the solid propellant grain 22 to the casing 20 and which are not consumed during the burning of the solid propellant. Fin panels 32 are provided proximal and peripheral the nozzle 14 for stabilizing the rocket 10 in flight.

Figure 4:
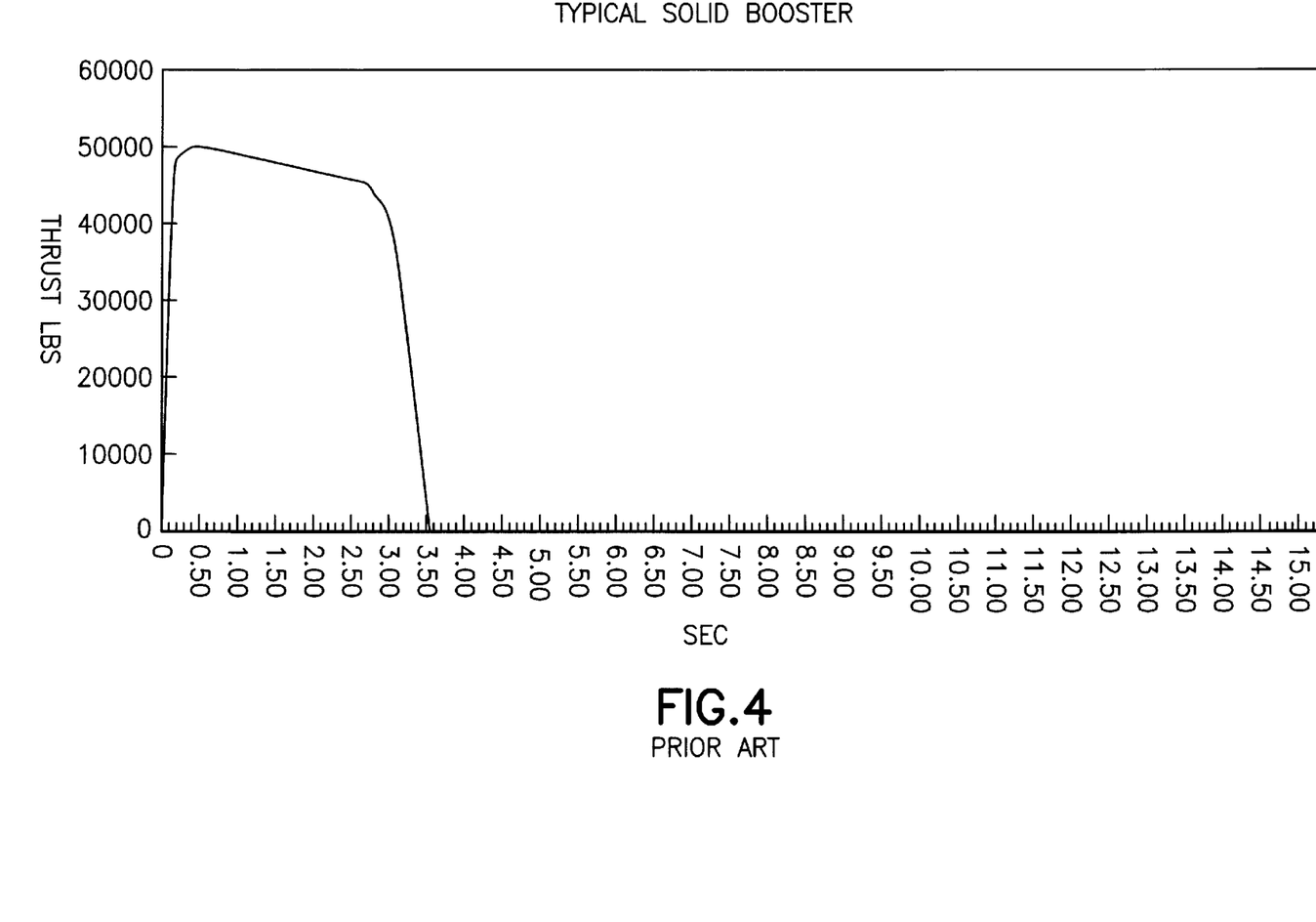
FIG. 4 is a graph of the thrust produced by the solid fuel booster of FIGS. 1–3.

Referring to prior art FIG. 4, the typical solid booster was developed as a short burn, high thrust (e.g., 3.0 seconds at 45000 lbf) heavy-lift motor. Such a booster can lift a payload weight of 200 pounds, and therefore has the ability to easily satisfy the minimum payload requirements for educational and military use. However, the booster, which burns out when the rocket is at 7000 feet at a velocity of 4000 feet per second (mach 3.6), falls short on the altitude requirement, reaching only an altitude of about twenty-one miles. Therefore, while a rocket using the solid booster satisfies the requirement of a heavy-lift flight vehicle, it is nevertheless insufficient for either educational and particular military purposes.

SUMMARY OF THE INVENTION

It is therefore an object of the invention to provide a rocket which has the high initial thrust followed by a sustained thrust.

It is also an object of the invention to enhance the performance of solid fuel boosters.

It is another object of the invention to provide an inexpensive rocket which has a relatively high payload capacity and can reach a relatively high altitude.

It is an additional object of the invention to provide a rocket including a modified existing solid booster which can sustain its maximum velocity for a relatively longer period of time enabling the rocket to reach high altitudes.

In accord with these objects, which will be discussed in detail below, the high initial thrust and high sustained thrust rocket of the invention generally comprises a solid propellant booster in combination with a hybrid propellant sustainer. According to one embodiment, the invention includes a motor having a fuel chamber and an oxidizer tank, a nose portion provided forward of the motor, and a nozzle surrounded by fins provided aft of the motor. The fuel chamber is provided with a relatively central solid propellant grain, and solid hybrid fuel surrounding the solid propellant grain. The oxidizer tank is filled with an oxidizing agent and coupled to the forward end of the fuel chamber. A pathway is provided between the oxidizer tank and the fuel chamber and has a valve or other barrier means designed to permit the release of oxidizing agent into the fuel chamber when the solid propellant is at least partially, and preferably when substantially, consumed. A barrier maintains the pathway in a closed or blocked condition until the barrier is removed.

Upon firing, or at another subsequent predetermined time or environmental condition within the fuel chamber, the barrier is removed, preferably by moving, removing, destroying, or consuming the barrier, and the solid propellant is relatively rapidly consumed to produce a high level of thrust. The force of the thrust creates high pressure in the fuel chamber such that the valve in the pathway remains closed. According to one preferred embodiment, after the solid propellant is consumed and the pressure in the fuel chamber drops below the pressure of the oxidizing agent in the oxidizer tank, the valve automatically opens to release the oxidizing agent in the chamber. The oxidizing agent exothermically reacts with the heated hybrid solid fuel (which surrounded the now-depleted solid propellant) to create a combustive reaction which creates additional and sustained thrust for the rocket for the duration of the hybrid fuel reaction. As a result, the rocket has a high initial thrust followed by a sustained thrust, enabling the rocket to maintain maximum velocity and reach a relatively higher altitude than otherwise possible with either a solid propellant system or a hybrid propellant system of similar size alone.

According to a second embodiment of the invention, the rocket of the invention includes a solid fuel booster with a nozzle, the booster being substantially similar to the booster described above but modified as described below, a nose portion, an oxidizer tank containing an oxidizing agent bolted between the solid booster and the nose portion, and a fin assembly provided around the nozzle. In the modified booster, the ignition basket is replaced with a pressure valve which is preferably coupled between the igniter port of the booster and the oxidizer tank. When the solid fuel in the solid booster is spent, the pressure valve opens to inject the oxidizing agent from the oxidizer tank into the casing of the booster (now empty of solid propellant grain). The oxidizing agent (reactant) exothermically reacts with the remaining insulation and bonding materials (which perform as a hybrid solid fuel) in the casing, consuming them as a propellant in a hybrid reaction which creates additional thrust for the rocket. The additional thrust enables the velocity of the rocket to be sustained, such that the rocket is able to reach a target altitude of more than thirty miles and typically at least fifty miles.

Additional objects and advantages of the invention will become apparent to those skilled in the art upon reference to the detailed description taken in conjunction with the provided figures.

BRIEF DESCRIPTION OF THE DRAWINGS

Prior art

Prior art

Prior art

Prior art

DETAILED DESCRIPTION OF THE PREFERRED EMBODIMENTS

Figure 5:
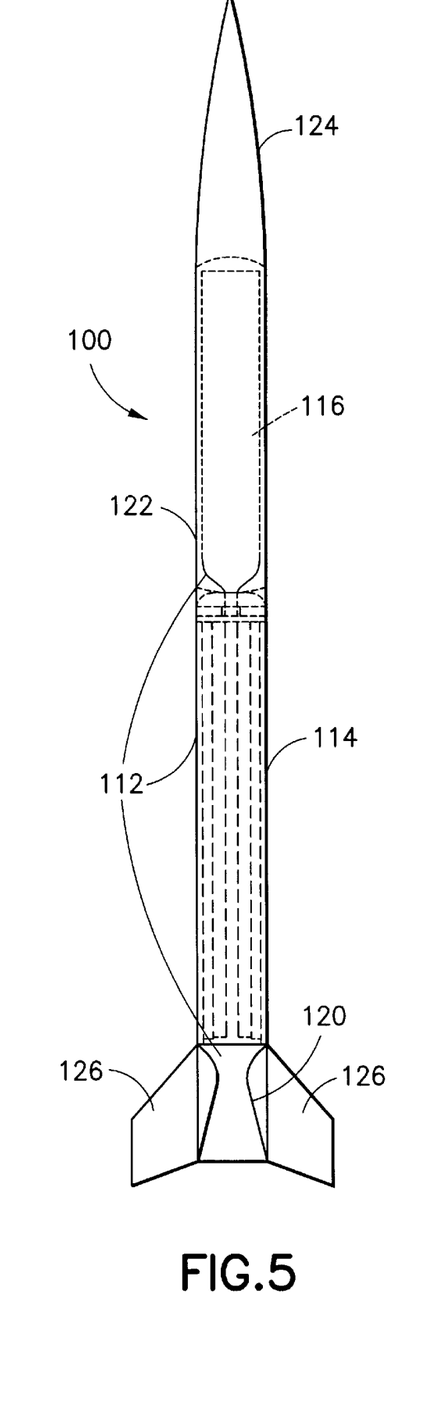
FIG. 5 is a side elevation of a first embodiment of the rocket of the invention.

Turning now to FIG. 5, a rocket 100 according to a first embodiment of the invention, is shown. The rocket 100 generally includes a motor (booster) 112 having a generally tubular fuel chamber 114, an oxidizer tank 116, and a nozzle 120 aft the fuel chamber. A tubular casing 122, preferably made from a strong, lightweight material, e.g., 6061 T-6 aluminum, surrounds the motor 112. A nose portion 124 is provided forward of the motor 112, preferably bolted to the oxidizer tank 116. A plurality of fins 126 surround the nozzle 120.

Figure 6:
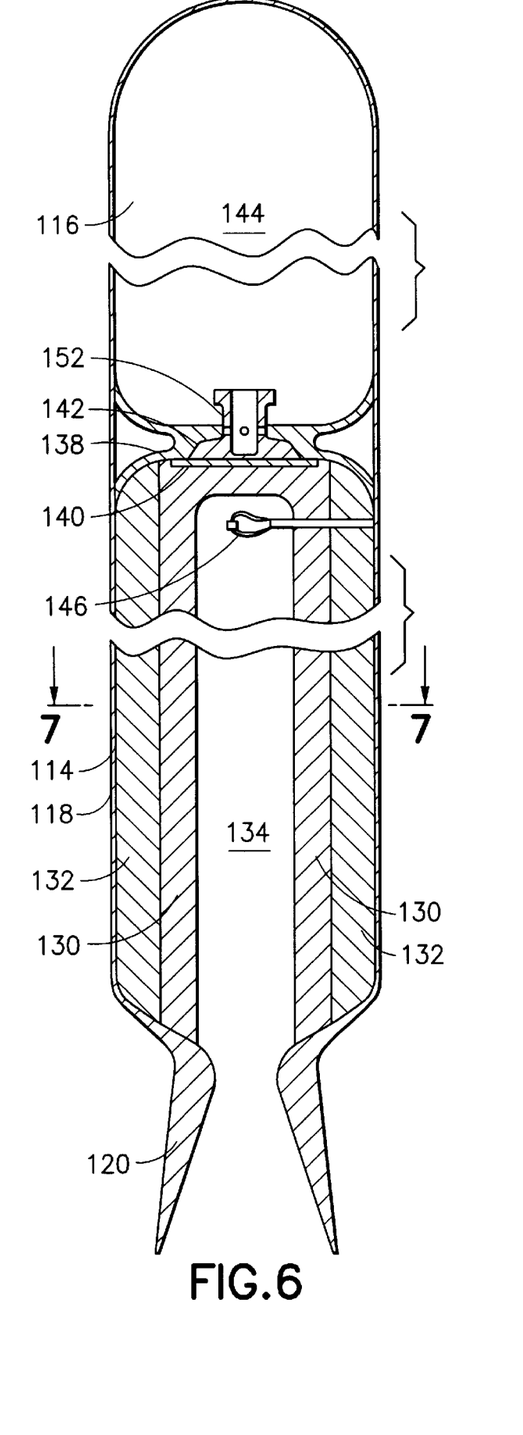
FIG. 6 is a partial section view of the rocket motor of the rocket of FIG. 5 according to a first embodiment of the invention.
Figure 7:
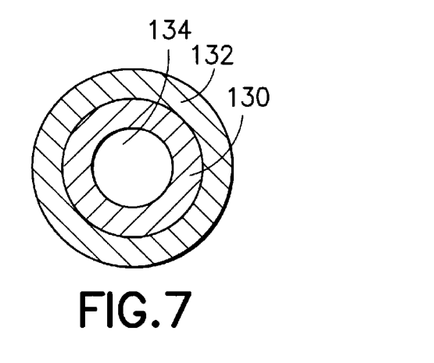
FIG. 7 is a cross-section through line 7—7 in FIG. 6.

More particularly, and referring to FIGS. 6 and 7, the fuel chamber 114 is preferably a strong, lightweight cylindrical casing 118 having a hybrid fuel grain 132 and a solid propellant grain 130. The hybrid fuel grain 132 is preferably formed from a thick-walled tubular cylinder of HTPB (hydroxyl-terminated polybutadiene), optionally including one or more of aluminum, magnesium, carbon or other fuel additives. The fuel grain may also be made from ABS resin, CTPB, PBAN or other fuel/binder systems. It is preferable that the hybrid fuel grain 132 be comprised of the same material as the binder of the solid propellant. As described in previously incorporated U.S. Pat. No. 5,715,675, the double butadiene bond in the HTPB has sufficient energy for use as a propellant.

The solid propellant grain 130 has a central channel 134 and is provided in the tubular interior of the hybrid fuel grain 132. The solid propellant grain 130 is preferably made from a combination of ammonium perchlorate, HTPB, and aluminum. The channel 134 performs as a combustion chamber for the solid propellant grain 130. It will be appreciated that the channel 134 may have a circular cross-section (FIG. 7).

Figure 8:
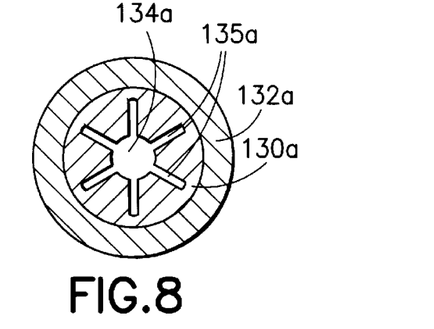
FIGS. 8–14 are cross-sectional illustrations of alternative configurations of the solid propellant and hybrid fuel.
Figure 9:
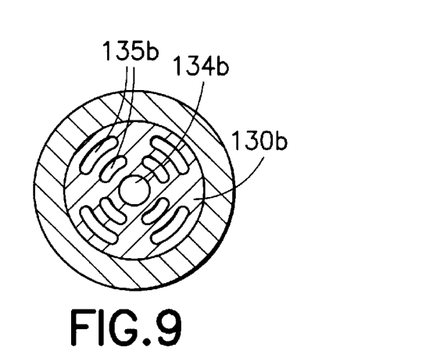
Figure 10:
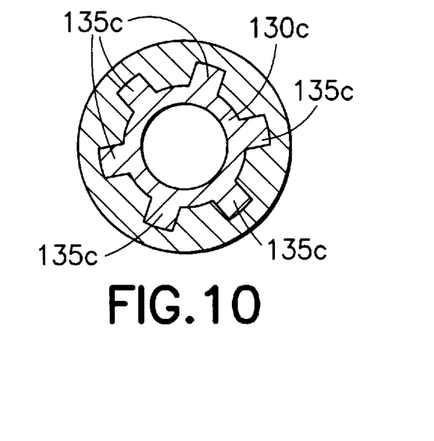
Figure 11:
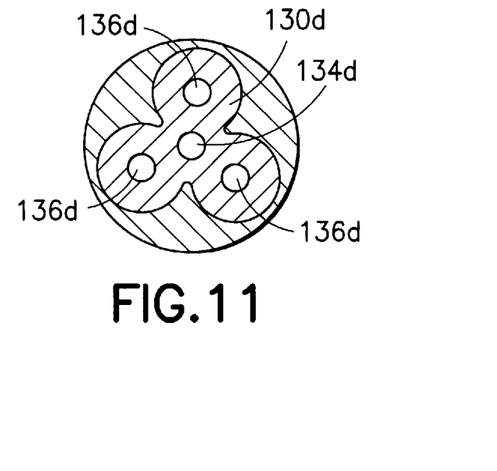
Figure 12:
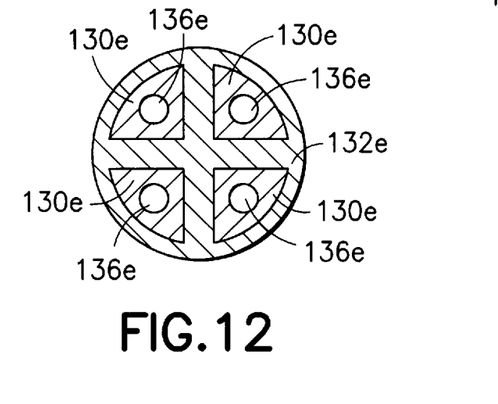
Figure 13:
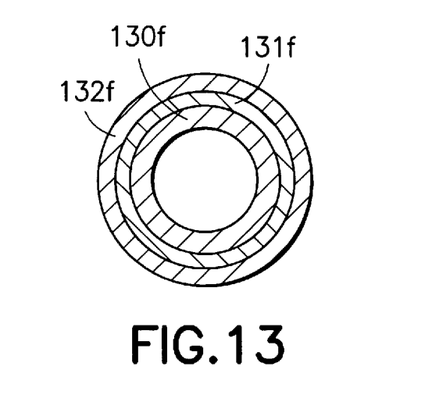
Figure 14:
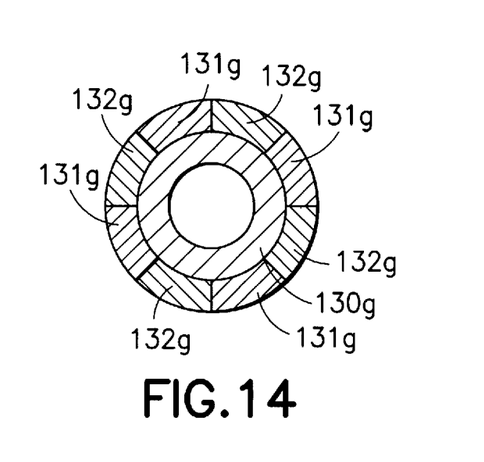

Alternatively, and as shown in FIG. 8, the central channel 134a may have another cross-section with spokes 135a designed to increase the surface area of the solid fuel 130a bounding the channel 134a. Referring to FIG. 9, the solid fuel grain 130b may also have a partially concentric channels 135b, as well as a central channel 134b. Furthermore, the solid fuel grain may be provided in configurations other than a formed hollow cylinder. For example, with respect to FIG. 10, the solid hybrid fuel grain 130c may be formed with a plurality of radially extending projections 135c. Moreover, referring to FIGS. 11 and 12, the solid fuel grain may be within, but not concentric with, the hybrid fuel grain. FIG. 11 particularly shows a tripartite solid fuel grain 130d, each having its own channel 136d, and a central channel 134d provided at a central portion of the solid fuel grain. FIG. 12 particularly shows a plurality of distinct solid fuel grain portions 130e, each surrounded by the hybrid fuel grain 132e. Each portion 130e is provided with a channel 136e. In addition, as shown in FIGS. 13 and 14, additional components such as secondary fuels, e.g., partial oxidizers, or exhaust plume signature doping compounds, may be arranged with respect to the solid-hybrid fuel configuration. For example, in FIG. 13, an additional component 131f is provided between the solid fuel grain 130f and the hybrid fuel grain 132f. Moreover, as shown in FIG. 14, additional component portions 131g may be interleaved with the hybrid fuel grain portions 132f about the solid fuel grain 130f. Other configurations for the hybrid fuel grain are described in U.S. Pat. No. 5,715,675.

Figure 15A:
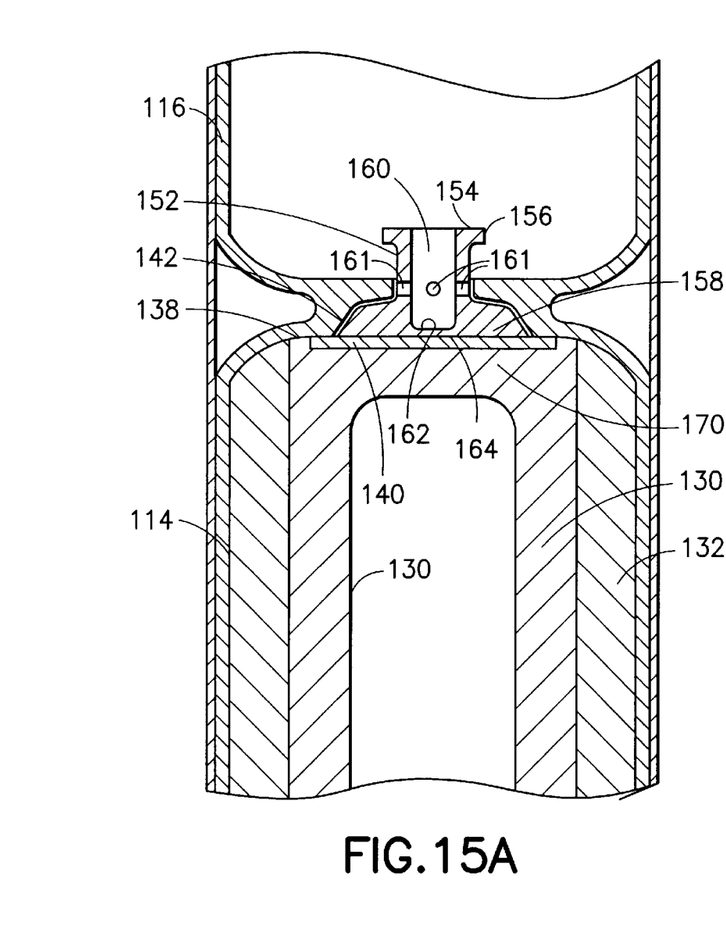
FIGS. 15A and 15B are section views of a first embodiment of a valve and barrier means provided in the rocket motor of the invention, the valve shown in closed and open positions, respectively.
Figure 15B:
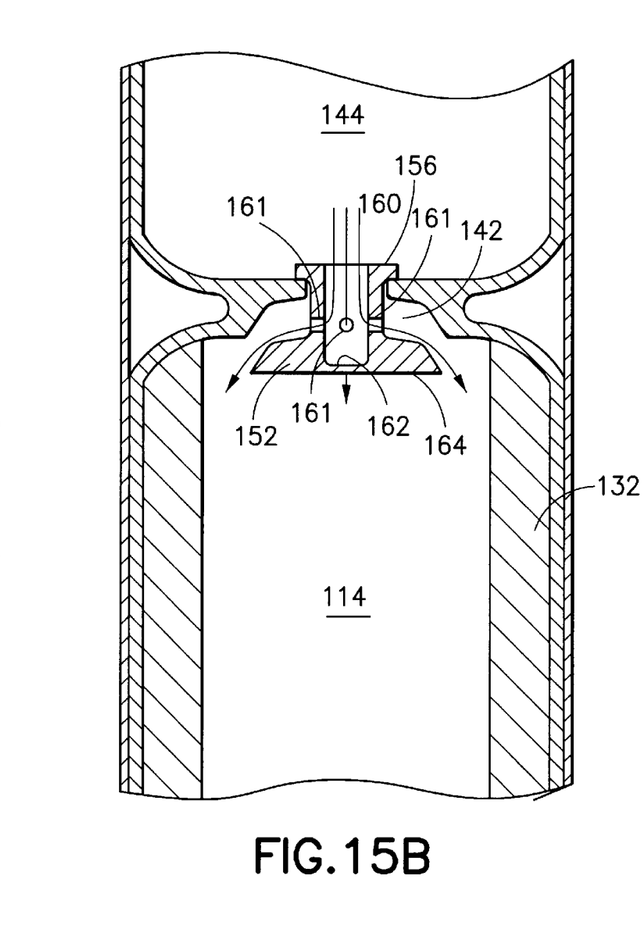

Referring to FIGS. 6, 15A, and 15B, in the preferred embodiment of the invention, the fuel chamber 114 is provided with a forward end 138, which is coupled, preferably by threads (not shown), to the oxidizer tank 116. Between the hybrid fuel grain 132 and the forward end 138, a hermetic seal burst disk 140 is provided. A valve port 142 for receiving a valve 152 therein, as described below, is provided between the burst disk 140 and the oxidizer tank 116. An igniter 146 for igniting the solid propellant 130 is also provided, preferably adjacent the forward end 138 of the fuel chamber 114.

The oxidizer tank 116 is provided with a preferably self-pressurizing oxidizing agent 144 (reactant) such as gaseous oxygen, fluorine, nitrous oxide ($NO_2$), or carbon dioxide ($CO_2$). Alternatively, the oxidizer tank may be partially filled with a non-self-pressurizing reactant at relatively low pressure, such as liquid oxygen (LOX), nitrogen tetroxide (NTO), red fuming nitric acid (RFNA), or hydrogen peroxide ($H_2O_2$) and with a pressurant at high pressure, such as helium or nitrogen.

Referring particularly to FIG. 15A, the valve 152, e.g., a poppet pressure injector valve, is provided in the valve port 142 between the oxidizer tank 116 and the fuel chamber 114. According to one preferred embodiment, the valve 152 generally includes a tank end 154 having a lip 156, and a relatively larger fuel chamber end 158. The valve 152 includes a bore 160 partially extending therein from the fuel chamber end 158. A plurality of substantially radially bored injector holes 161 which intersect the bore 160 are provided forward of the larger fuel chamber end 158. The bore 160 includes an end wall 162 having an area $\theta_T$. The larger fuel chamber end 158 of the valve 152 includes a surface 164 having an area $\theta_C$. When the valve 152 is in a closed position, the valve 152 is seated in the valve port 142, with the relatively larger end 158 occluding passage through the valve port 142.

Turning now to FIGS. 15A and 15B, and in accord with the operation of the valve 152, the valve remains in a closed position (i.e., with the valve 152 seated in the valve port 142) when the pressure in the fuel chamber 114 (PC) multiplied by the area $\theta_C$ of the valve surface 164 is greater than the pressure in the tank 116 ($P_T$) multiplied by the area $\theta_T$ of the end wall 162. For example, when the solid propellant 130 is initially being consumed and creating a high level of thrust, the fuel chamber pressure $P_C$ will be substantially greater than the tank pressure $P_T$, and $P_C$ multiplied by $\theta_C$ will be greater than $P_T$ multiplied by $\theta_T$ and force the valve assembly to remain in a closed position. However, when the solid propellant 130 is substantially completely consumed, the fuel chamber pressure $P_C$ will be less than the tank pressure $P_T$, and $P_C$ multiplied by $\theta_C$ will be less than $P_T$ multiplied by $\theta_T$ causing the valve 152 to break the burst disk 140 and move into an open position (FIG. 15B). Referring to FIG. 15B, once the valve 152 opens, the oxidizing agent 144 travels through the bore 160 and out the injectors 161 into the fuel chamber 114. The lip 156 on the valve 152 prevents the valve 152 from being forced completely through the valve port 142 and into the fuel chamber 114. The relative diameters of the end wall 162 and the valve surface 164 may be adjusted to precisely configure the valve 152 to open upon meeting predetermined conditions within the fuel chamber 114 and the tank 116, for example, when a certain percentage of the solid propellant 130 has been consumed. In addition, the valve 152 is preferably operable as a pintle such that the oxidizer flow rate may be adjusted to thereby adjust the thrust level.

Referring back to FIG. 15A, it will be appreciated that prior to ignition of the solid propellant 130 of the rocket motor, the pressure $P_T$ of the self-pressurizing oxidizing agent 144 (or pressurant) in the tank 116 is substantially greater than the fuel chamber pressure $P_C$ (approximately 1 atmosphere), and the valve 152 is urged to open. However, it is undesirable for the valve assembly to open until after launch (i.e., until after at least a portion of the solid propellant has been consumed), and more preferably until substantially all of the solid propellant has been consumed. Therefore, a barrier 170 is provided at the forward end 138 adjacent the burst disk 140 to physically retain the valve 152 in a closed configuration until the barrier is removed (e.g., after ignition of the solid propellant or at some other predetermined time) regardless of the pressure differential between the tank and the fuel chamber. According to one embodiment of the barrier, the barrier 170 may be a disk or other formation of solid propellant 130 which physically blocks the valve 152 from the moving within the valve port 142. Only after consumption of the solid propellant barrier 170 is the valve 152 permitted to operate in accord with description provided above.

Figure 16:
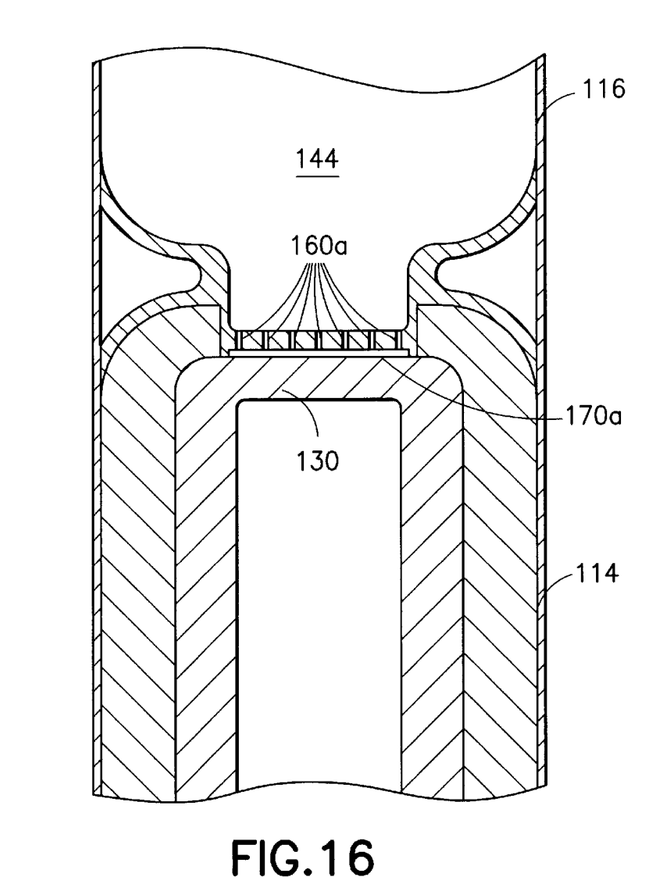
FIG. 16 is a section view of a first alternate barrier means for the rocket motor of the invention.

It will be appreciated that the barrier need not be made from solely from solid propellant. Turning now to FIG. 16, a burst disk barrier 170a is shown blocking passages 160a between the tank 116 and the fuel chamber 114. The burst disk 170a isolates the oxidizing agent 144 in the tank 116 from the fuel chamber 114. The burst disk 170a can be made from plastic, aluminum, steel, or another material, and can be designed to fail by, for example, over-pressurizing the tank, melting, or annealing the disk 170a to a lower tensile strength by the high fuel chamber temperature during solid propellant burning, such that the disk is breakable under the pressure of the oxidizing agent 144 in the tank 116 when the solid propellant 130 is consumed. The disk 170a is thereby adapted to be destroyed at a desired time as a result of the conditions within the rocket motor, and this controllably permits passage of the oxidizing agent 144 from the tank 116 through passages 160a and into the fuel chamber 114.

Figure 17:
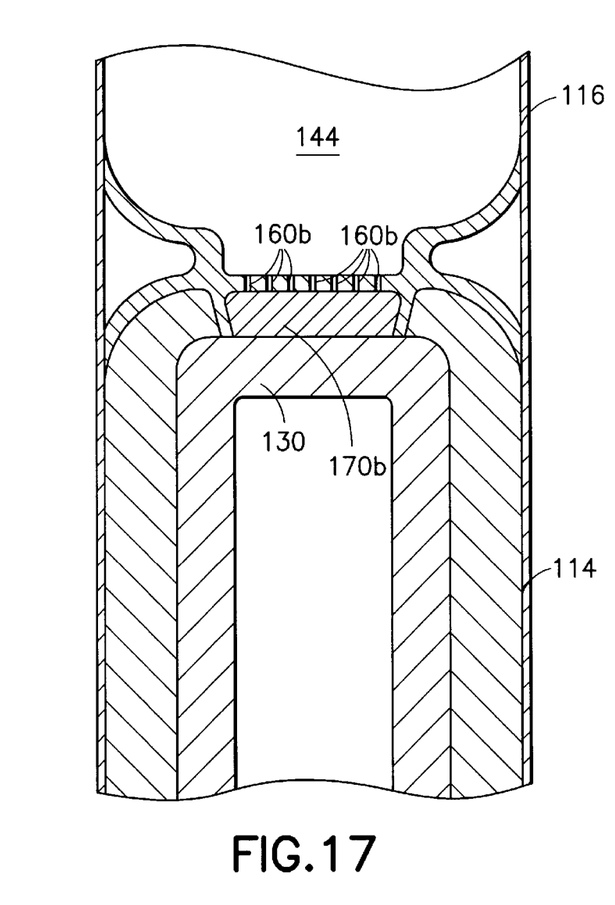
FIG. 17 is a section view of a second alternate barrier means for the rocket motor of the invention.

Referring now to FIG. 17, it will also be appreciated that alternatively a pyrotechnic plug 170b may be used to block and controllably clear one or more pathways 160b from the tank 116 to the fuel chamber 114. The pyrotechnic plug 170b is designed to substantially completely block the pathways 160b from the tank 116 to the fuel chamber 114. At a predetermined time, controlled by consumption of a selected portion of solid propellant 130, time delay timers, pressure sensors, gravity force switches, accelerometers, remote control, or other means, a fuse means, e.g. the burning solid propellant itself, is activated to destroy the plug 170b and clear the pathways 160b to permit the oxidizing agent 144 to enter the fuel chamber 114.

Figure 18:
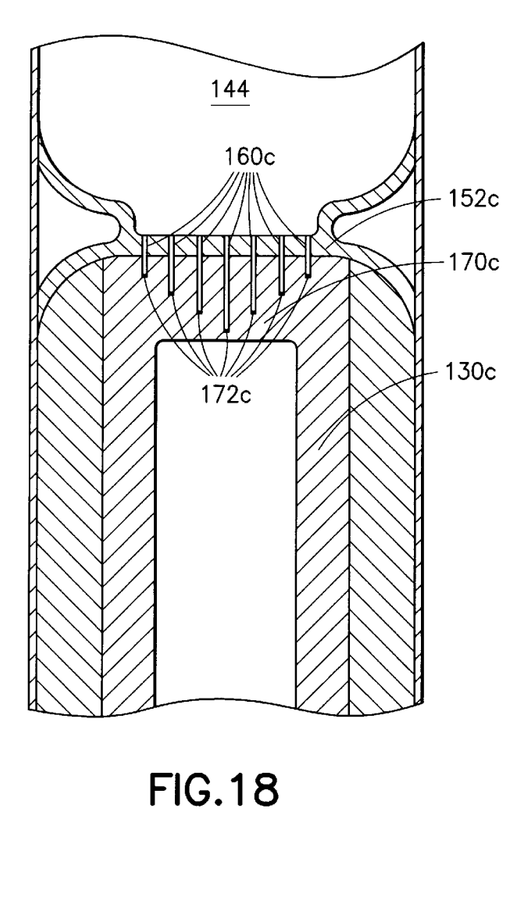
FIG. 18 is a section view of a third alternate barrier means for the rocket motor of the invention.

Turning now to FIG. 18, it will be appreciated that a multitubed valve 152c can also be used to control the flow of oxidizing agent 144 from the tank 116 to fuel chamber

114. The multitubed valve 152c consists of a plurality, e.g., dozens, of tubes 160c (injectors) provided in a portion 170c of the solid propellant 130. The tubes 160c are preferably stainless steel or aluminum tubes, e.g., of the kind used in hypodermic needles. The tubes are hermetically sealed with solder plugs 172c. As the solid propellant portion 170c burns, the tubes 160a are exposed, the solder 172c melts to clear the tubes, and oxidizing agent 144 can flow through the tubes 160c. By adjusting the relative height of the tubes 160c, the amount of exposure of individual tubes over time can be controlled. For example, by providing the tubes in a convex arrangement, i.e., with relatively longer tubes at the center and relatively shorter tubes outward from the center, the oxidizing agent flow rate, and thus the thrust level can be controlled. Alternatively, as it will be appreciated that the central portion of the solid propellant portion 170c will be consumed most quickly, the tubes can be arranged in a concave configuration to release oxidizing agent at substantially the same time. Other tube height arrangements can also be used.

Figure 19:
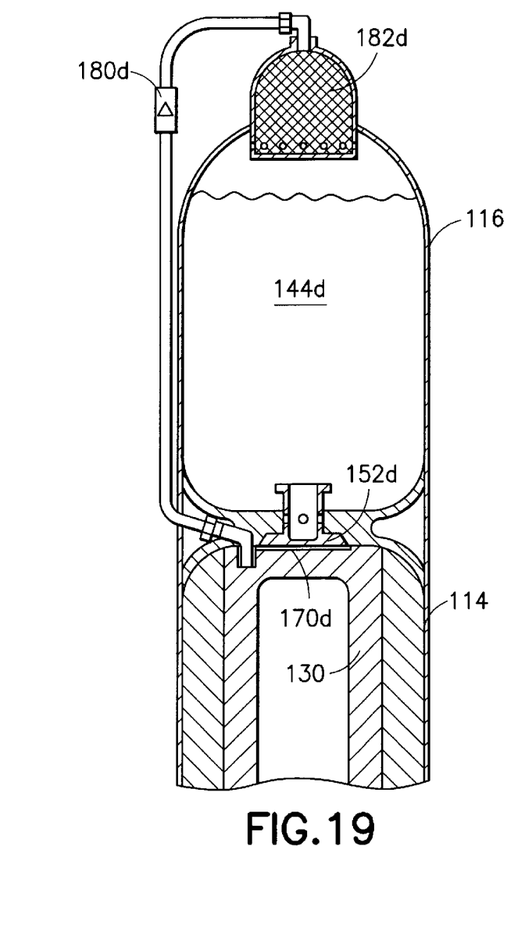
FIG. 19 is a section view of a fourth alternate barrier means for the rocket motor of the invention.

Turning now to FIG. 19, alternatively, the oxidizer tank 116 need not be maintained in a pressurized state by the oxidizer 144d. For example, the solid propellant grain 130 geometry may be configured such that peak fuel chamber pressure PC is achieved at the end of the solid propellant burn. During the solid propellant 130 burn, fuel chamber pressure is tapped off from the chamber 116 through a check valve 180d, and then through a gas chiller 182d, where it is then fed into the oxidizer tank 116 to pressurize the liquid oxidizer 144d for the hybrid motor. Until the end of the burn the pressure is insufficient to cause a valve 152d, e.g., a poppet valve, to open. This eliminates the need for separate pressurization of the oxidizer 144d (via the use of a self-pressurizing oxidizer or the use of a distinct pressurant). At the end of the solid propellant 130 burn, when the fuel chamber 114 is under peak pressure, the tapped pressure rises high enough within the tank 116 to force the valve 152 open by causing a burst disk 170d, as described above, to fail.

Referring back to FIGS. 6 and 15A, in a pre-launch configuration the rocket 100 is tethered to a launch platform according to any means known in the art. Upon ignition of the solid propellant 130, the rocket 100 is freed from the launch platform (e.g., by melting the tethering) and the high thrust produced by consumption of the solid propellant lifts the rocket. In the preferred embodiment, substantially immediately after the ignition of the solid propellant, the barrier 170 is removed (e.g., by consumption), eliminating the physical barrier which retains the valve 152 in its closed configuration. The high thrust produced by the solid fuel consumption creates pressure in the fuel chamber 114 which is substantially greater than the pressure in the tank 116. This maintains the valve 152 in the closed configuration. Then, referring to FIG. 15B, after the solid propellant is consumed, the pressure PC in the fuel chamber 114 drops substantially below the pressure $P_T$ in the oxidizer tank 116 and results in the valve 152 opening to release the oxidizing agent 144 into the fuel chamber. The oxidizing agent 144 exothermically reacts with the now heated (from the solid propellant burn) hybrid fuel grain 132 to create a combustive reaction which creates additional thrust for the rocket until the oxidizing agent is spent. As a result, the rocket has high initial thrust and a later additional thrust, enabling the rocket to maintain maximum velocity and reach a relatively higher altitude than possible with either a solid propellant system or a hybrid propellant system alone.

It will be appreciated with respect to the alternate embodiments in which a barrier is provided which acts as a valve (i.e., the burst disk 170a (FIG. 16), the pyrotechnic plug 170b (FIG. 17), and the multitube valve 152c with a solid propellant portion barrier 170c (FIG. 18)), that the barrier is not removed until after substantially all of the solid propellant grain is consumed. Likewise, the same result is achieved with respect to the alternate embodiment in which the pressure in the fuel chamber is tapped to trigger the destruction of a barrier such as a burst disk (FIG. 19). Thereafter, the oxidizing agent is permitted to exothermically react with the heated hybrid fuel in a combustive reaction as described above.

Figure 20:
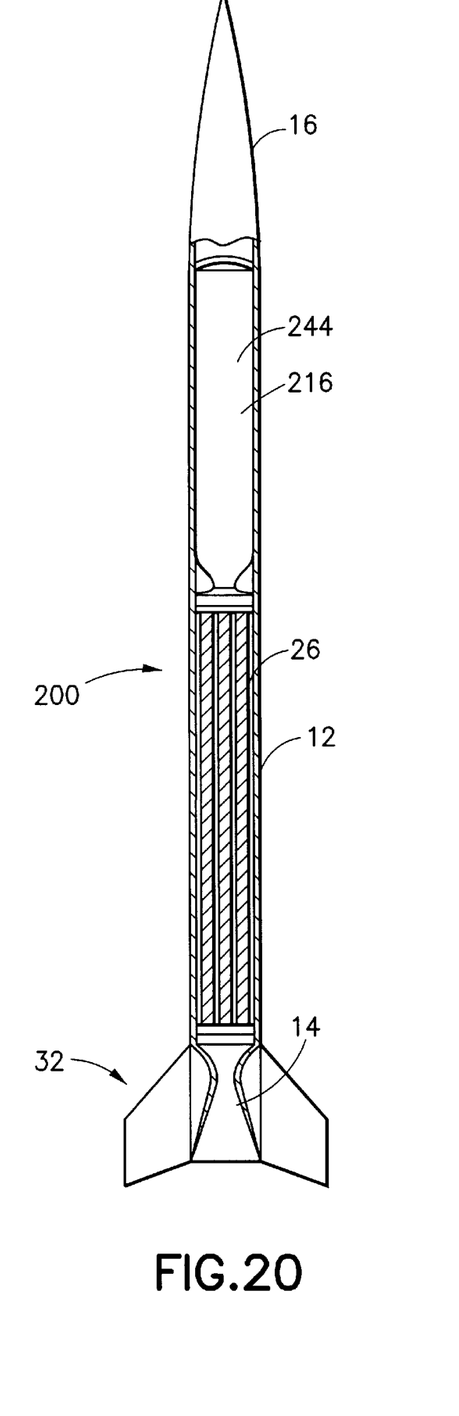
FIG. 20 is a section view of a rocket according to a second embodiment of the invention.

Referring now to FIG. 20, a rocket 200 according to a second embodiment of the invention, similar to the first embodiment, is shown. The rocket 200 includes a solid fuel booster 12 with a nozzle 14, the booster being substantially similar to the booster described above with reference to the prior art (see FIG. 1) with corresponding elements having the same reference numerals, but modified as described below. The rocket 200 also includes a nose portion 16, an oxidizer tank 216 bolted between the booster 12 and the nose portion 16 and containing an oxidizing agent 244. A fin assembly 32 is provided around the nozzle 14.

In the modified booster, the ignition basket (see prior art FIG. 3) is replaced with a valve (or other removable barrier), as described above with respect to the first embodiment of the invention, which is preferably coupled between the igniter port of the booster 12 and the oxidizer tank 216. When the double-base nitrocellulose nitroglycerin solid propellant in the booster is spent, the valve opens (or the barrier is removed), as described above, to inject the oxidizing agent 244 from the oxidizer tank 216 and into the casing of the booster (now empty of solid propellant grain). The oxidizing agent exothermically reacts with the now heated remaining insulation, inhibitor, liner, immobilizer, and resonance rods, collectively insulation and bonding materials' 26, in the casing to create a combustive reaction in which the insulation is consumed in a hybrid fuel reaction which creates additional thrust for the rocket.

Figure 21:
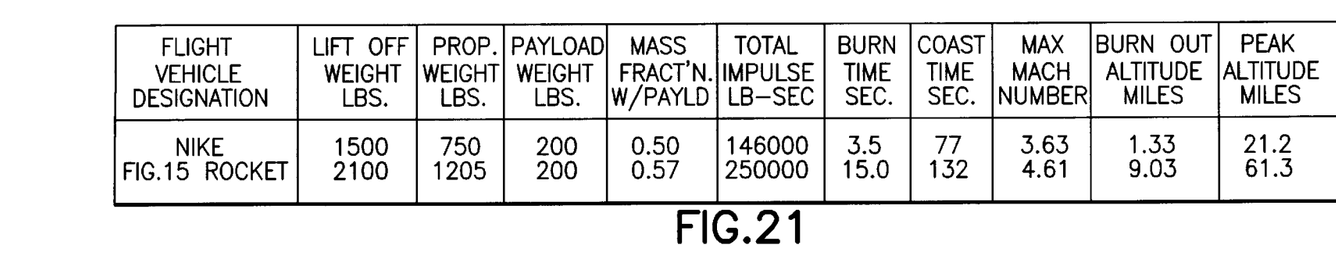
FIG. 21 is a table comparing statistics of a solid rocket and the rocket according to the second embodiment of the invention.
Figure 22:
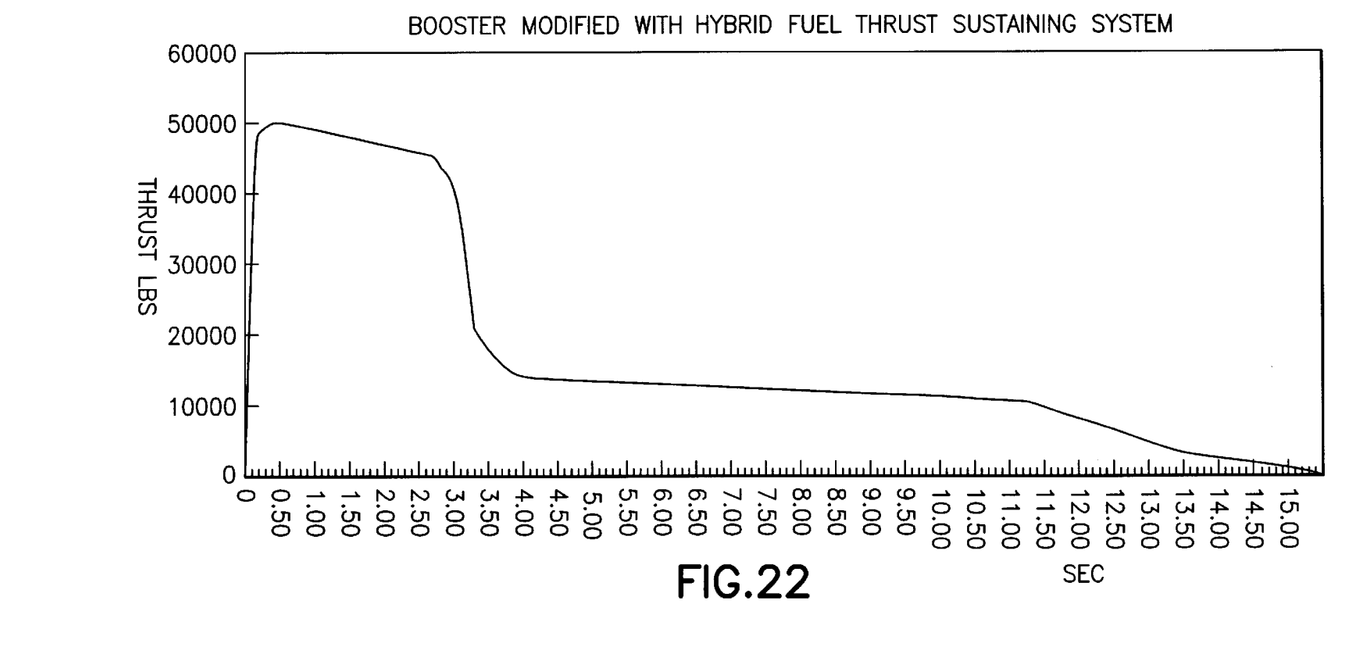
FIG. 22 is a graph of the thrust produced by the rocket according to the second embodiment of the invention.

Referring to FIG. 21, the 750 pounds of solid propellant in the prior art booster deliver an impulse of approximately 146,000 lbf-sec. In addition, there exists approximately 100 pounds of insulation and bonding materials in the booster. If sixty-five percent of the insulation and bonding materials is consumable in a hybrid reaction, and if an oxygen to fuel ratio of seven to one is preferred, approximately 65 pounds of fuel when combined with approximately 455 pounds of oxidizing agent in the tank provide a total of 520 pounds of propellant. With a conservative specific impulse of 200 seconds, the hybrid propellant provides an additional impulse of 104,000 lbf-sec, thereby increasing the total impulse to 250,000 lbf-sec. This impulse, delivered through the booster nozzle provides a thrust of approximately 12,500 lbf (as can be derived from FIG. 22). Dividing the impulse of 104,000 lbf-sec by the thrust of 12,500 lbf provides an extra 8.3 second burn time for the insulation and bonding materials (hybrid fuel). Typically, a nitrous oxide blowdown hybrid demonstrates a 15% regressive thrust trace and a gas phase blow down of about 3 seconds. As a result, the thrust level naturally and gradually decreases to keep the nozzle expansion constant with altitude. Therefore, the burn time can be stretched to approximately 12 seconds, plus the original 3 second solid fuel burn, totaling 15 seconds. With the thrust sustained for a 15 second burn, the burn-out altitude for the 2100 pound rocket (including approximately 1205 pounds of solid and hybrid propellant and a 200 pound payload) is increased to 47,000 feet (over 9 miles) and the velocity is increased to 4450 feet per second (mach 4.6)

(versus the 7,000 feet burn-out altitude and 4000 feet per second velocity (mach 3.6) of the original 1500 pound booster). After burn-out, the rocket continues to coast for 132 seconds (versus 77 seconds for the original booster). Using a 200 pound payload, twice the identified requirement for educational uses, an altitude of over 61 miles can be reached (versus the 21 miles with the standard booster).

Moreover, with respect to each of the above described embodiments, the high thrust, short burn time solid propellant quickly boosts the rocket to velocity and then transitions into a long burn hybrid sustain phase. Particularly beneficial for military tactical use, this manner of operation relatively reduces the time and ability of launch detection by limiting the exposure of the solid propellant smoke trail and HCl exhaust plume by quickly transitioning into a no smoke, non-HCl exhaust during the long burn hybrid sustain phase.

There have been described and illustrated herein embodiments of a rocket. While particular embodiments of the invention have been described, it is not intended that the invention be limited thereto, as it is intended that the invention be as broad in scope as the art will allow and that the specification be read likewise. Thus, while particular types of valve/barrier assemblies have been disclosed, it will be understood that other valves and barriers can likewise be used. Variations on typical valves used in liquid type motors may be used. For example, the valves may be activated by using burn time delay timers, pressure sensors, gravity force switches, and accelerometers to release oxidizing agent. A ball valve actuated by a motor, pneumatic or hydraulic cylinder, or pyrotechnic means can be used. A gate or guillotine valve block having a barrier which can be forced into an unobstructing position by a pyrotechnic, pneumatic, or other means can be used. A rotary disk valve having a plurality of holes which can be rotated from an obstructing orientation to an unobstructing orientation can be used, wherein when the valve is activated the disk rotates and the holes in the disk align with the injector holes. The rotary disk valve may be soldered closed, the solder designed to melt upon exposure to the temperature associated with burning solid propellant. In addition, with a non-self-pressurizing oxidizing agent, a hermetically sealed burst disk can be provided over the valve until the tank is pressurized, whereupon the valve is forced through the burst seal disk to permit oxidizing agent flow into the fuel chamber. It will therefore be appreciated that a myriad of different valves and barriers may be used in the rocket motors of the invention, so long as the valves and barriers provide the function necessitated by the invention.

Furthermore, while particular solid propellant, hybrid fuels, and oxidizing agents have been disclosed, it will be appreciated that other fuels and oxidizing agents can be used as well. Also, while particular couplings, e.g., threads and bolts, have been disclosed with respect to the assembly of the rockets, it will be recognized that coupling means which operate to provide the required couplings can also be used. Moreover, while particular configurations have been disclosed in reference to the arrangement of the hybrid fuel about the solid propellant it will be appreciated that other configurations could be used as well. In addition, while a particular fin assembly is preferred, it will be understood that other fin assemblies can be similarly used. A NIKE solid fuel booster is a preferred booster with respect to the second embodiment of the invention. Nevertheless, it will be appreciated that other military and space agency standard and/or surplus solid fuel boosters can be used in place of the NIKE booster. It will therefore be appreciated by those skilled in the art that yet other modifications could be made to the provided invention without deviating from its spirit and scope as so claimed.

What is claimed is:

1. A propulsion system for a projectile, comprising:
    a) a fuel chamber having a forward end and provided with a solid propellant and a solid fuel about said solid propellant, said solid propellant provided with a central channel;
    b) a container for storing a fluid reactant therein, said container coupled to said forward end of said fluid chamber;
    c) a pathway between said fuel chamber and said container; and
    d) pathway blocking means for blocking said pathway until said solid propellant is at least partially consumed, and thereafter permitting said fluid reactant to pass from said container through said pathway and into said fuel chamber to react with said solid fuel in a hybrid fuel reaction.

2. A propulsion system according to claim 1, wherein:
    said pathway blocking means is a burst disk which blocks said pathway until said solid propellant is substantially consumed.

3. A propulsion system according to claim 1, wherein:
    said pathway blocking means is a pyrotechnic which blocks said pathway until said solid propellant is substantially consumed.

4. A propulsion system according to claim 1, wherein:
    said pathway blocking means is a valve.

5. A propulsion system according to claim 4, wherein:
    said valve is one of a pressure valve and a multitube valve.

6. A propulsion system according to claim 4, wherein:
    said valve is adapted to automatically open when the pressure within said container is greater than the pressure within said fuel chamber.

7. A propulsion system according to claim 6, further comprising:
    pressure generating means coupled between said fuel chamber and said container for generating pressure within said container by utilizing combustion of said solid propellant within said fuel chamber.

8. A propulsion system according to claim 6, further comprising:
    e) a barrier means for maintaining said valve in a closed position regardless of a pressure differential between said container and said fuel chamber until said barrier means is removed, said barrier means being removable simultaneously with or after said solid propellant is ignited.

9. A propulsion system according to claim 8, wherein:
    said barrier means is removed by destruction of said barrier means.

10. A propulsion system according to claim 8, wherein:
    said solid propellant is comprised of a solid propellant material, and said barrier means is comprised of said propellant material such that said barrier means is adapted to be destroyed by consumption.

11. A propulsion system according to claim 1, wherein:
    said fluid reactant is an oxidizing agent and said solid fuel comprises a carbon compound.

12. A projectile, comprising:
    a) a motor having a forward end and an aft end, said motor including,
        i) a fuel chamber having a forward end and provided with a solid propellant and a solid fuel about said solid propellant, said solid propellant provided with a central channel, ii) a container for storing a fluid reactant therein, said container coupled to said forward end of said fluid chamber, iii) a pathway between said fuel chamber and said container, and iv) pathway blocking means for blocking said pathway until said solid propellant is at least partially consumed, and thereafter permitting said fluid reactant to pass from said container through said pathway and into said fuel chamber to react with said solid fuel in a hybrid fuel reaction;

b) a tubular casing around said motor;

c) a nose portion coupled to said forward end of said motor; and d) a nozzle coupled to said aft end of said motor.

13. A projectile according to claim 12, wherein:

said pathway blocking means is a burst disk which blocks said pathway until said solid propellant is substantially consumed.

14. A projectile according to claim 12, wherein:

said pathway blocking means is a pyrotechnic which blocks said pathway until said solid propellant is substantially consumed.

15. A projectile according to claim 12, wherein:

said pathway blocking means is a valve.

16. A projectile according to claim 15, wherein:

said motor further includes, v) a barrier means for maintaining said valve in a closed position regardless of a pressure differential between said container and said fuel chamber until said barrier means is removed, said barrier means being removable by destruction of said barrier means simultaneously with or after said solid propellant is ignited.

17. A projectile according to claim 15, wherein:

said valve is adapted to automatically open when the pressure within said container is greater than the pressure within said fuel chamber.

18. A projectile according to claim 17, further comprising:

pressure generating means coupled between said fuel chamber and said container for generating pressure within said container by utilizing combustion of said solid propellant within said fuel chamber.

19. A projectile according to claim 12, wherein:

said fuel chamber and said nozzle of said motor together comprise a rocket booster.

20. A projectile according to claim 19, wherein:

said rocket booster includes insulation and bonding materials at least partially surrounding said solid propellant, and said fuel is said insulation and bonding materials.

* * * * *